Aug. 16, 1927.
E. T. FERNGREN
1,639,453
SHEET GLASS WIDTH MAINTAINING SHIELD
Original Filed Dec. 26, 1924
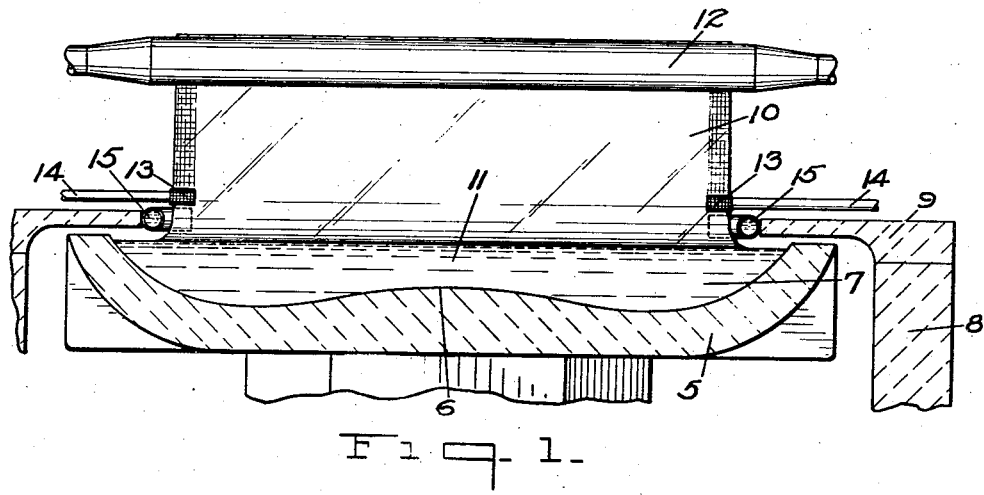
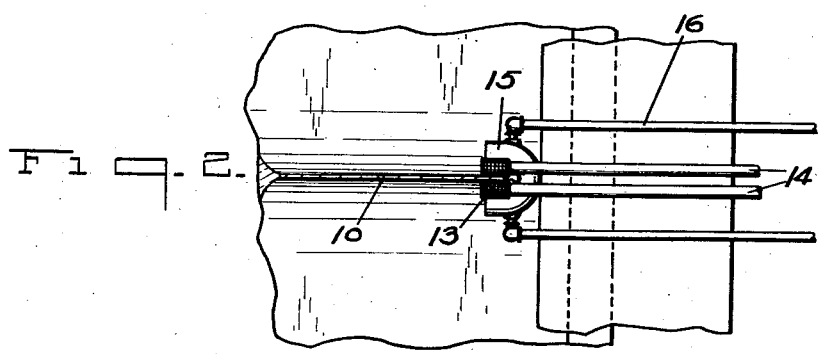
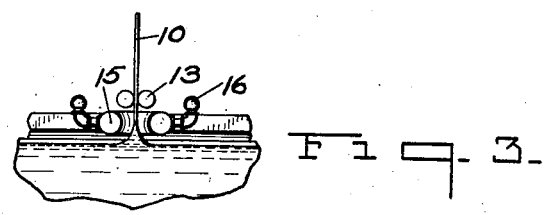
INVENTOR.
Enoch T. Ferngren.
Frank Fraser
ATTORNEY.

Patented Aug. 16, 1927.

1,639,453

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS WIDTH-MAINTAINING SHIELD.

Original application filed December 26, 1924, Serial No. 758,133. Divided and this application filed September 17, 1925. Serial No. 56,852.

The present invention relates to a shield for use in sheet glass apparatus.

An object of the invention is to provide a method and apparatus for continuously producing sheet glass from a source of molten glass, and has particular reference to sheet width maintaining means and a protective device for said means.

Another object of the invention is to provide sheet glass apparatus wherein a sheet of glass may be continuously drawn from a source of molten glass, and includes width maintaining devices adapted to engage the edges of the sheet being drawn, the said apparatus including a construction whereby heat may be directed along the border portions of the source of molten glass from which the sheet is drawn, the invention relating particularly to a shield adapted to protect the width maintaining devices from the heat thus directed upon the molten glass, the shield also absorbing sufficient heat from the edges of the sheet source to build up a tractile body of glass, thus making it possible to draw a sheet from relatively hot glass.

Other objects and advantages will become apparent during the course of the following description.

In the drawings wherein like numerals are employed to designate like parts throughout the same, Fig. 1 is a transverse section through a container and source of molten glass showing the invention partially in section, Fig. 2 is a top plan thereof, and Fig. 3 is an end elevation.

In the patent to Colburn, No. 1,248,809 a sheet of glass is continuously drawn from a source of molten glass in a vertical position and is deflected over a bending roll, and passed off in a horizontal plane over a flattening table and through an annealing leer. The batch from which the molten glass is formed is introduced within one end of a tank furnace, wherein an intense heat is applied thereto forming a mass of molten glass. The glass is allowed to flow through the tank furnace where it is refined at the opposite end thereof. The refined glass is then flowed through a cooling chamber where the relatively hot glass is conditioned to a state where it can be drawn from a pot which communicates with the cooling chamber in sheet form.

With this and similar types of apparatus, the central flow of glass at the point of draw is relatively hotter and more fluid than the border portions, because of the heat absorption caused by the sides of the cooling chamber and draw-pot, and also because of the inherent tendency of molten glass to adhere.

In my copending application, Serial No. 758,133, filed Dec. 26, 1924, of which this application is a division, I have set forth means for equalizing and making uniform the temperature of the molten glass at the point of draw.

A portion of the apparatus disclosed in my copending application is shown in Fig. 1, wherein the numeral 5 designates a draw-pot, whose central longitudinal portion 6 is shaped to produce a more shallow flow of glass at the center than at the edges 7. Arranged along the sides of the draw-pot 5 are walls 8 upon which rest slabs 9, whereby heat currents may be passed up between the draw-pot and wall, and directed along the border portions of the mass of molten glass from which the sheet is drawn. The sheet 10 is drawn from the glass 11 in a vertical plane, after which it may be deflected over the bending roll 12. In the Colburn machine is disclosed the use of rotatable knurled rolls 13 carried upon shafts 14. These knurled rolls are arranged at the edges of the sheet and engage the same in a manner to prevent narrowing after the glass leaves the said rolls.

Normally these knurled rolls are maintained at the proper temperature by circulating a cooling medium therethrough. In order to protect the rolls from the heat introduced along the border portions in accordance with my copending application, a shield 15 is provided, and as shown in the drawings, sufficient heat will not strike the rolls to hinder their efficient operation. The shield 15 is shown in the form of a substantially U-shaped cooler, adapted to permit circulation of a cooling medium as through the pipes 16. The shape of the cooler is not necessarily restricted to that shown as the construction may be modified so that the knurls can be raised or lowered closer to the source or farther away therefrom. The important feature of this invention is the shield adapted to protect the knurled rolls from heat present around the molten glass.

In addition to shielding the knurls, the coolers absorb sufficient heat from the border portion of the sheet source to permit a sheet to be drawn by the aid of the width maintaining means. The border portions of the flow of molten glass will be maintained at a high temperature right up to the sheet supplying meniscus where the coolers and knurls will act upon the glass as has been described.

Claims:

1. In sheet glass apparatus, means for drawing a sheet from a mass of molten glass, including width maintaining means, and means arranged beneath the said width maintaining means for shielding the same.

2. In sheet glass apparatus, means for drawing a sheet from a mass of molten glass, including width maintaining means, and internally cooled means arranged beneath the said width maintaining means for protecting the same from the heat present around the molten glass from which the sheet is drawn.

3. In sheet glass apparatus, means for drawing a sheet from a mass of molten glass, including width maintaining means, and a shield arranged beneath the said width maintaining means for protecting the same from heat.

4. In sheet glass apparatus, means for drawing a sheet from a mass of molten glass, including width maintaining means, and shielding means arranged around the width maintaining means.

5. In sheet glass apparatus, means for drawing a sheet from a mass of molten glass, including width maintaining means, and a shield arranged around the width maintaining means.

6. In sheet glass apparatus, means for drawing a sheet from a mass of molten glass, including width maintaining means, and an internally cooled shield arranged around the width maintaining means.

7. In sheet glass apparatus, means for drawing a sheet from a mass of molten glass, rotatable rolls arranged at the edges of the sheet to prevent narrowing thereof, and an internally cooled shield arranged around the said rolls.

8. In sheet glass apparatus, means for drawing a sheet from a mass of molten glass, rotatable rolls arranged at the edges of the sheet to prevent narrowing thereof, and a shield positioned around the rolls.

9. In sheet glass apparatus, means for drawing a sheet from a mass of molten glass, rotatable rolls arranged at the edges of the sheet to prevent narrowing thereof, a shield positioned around the rolls, and means for passing a cooling medium through the shield.

Signed at Toledo, in the county of Lucas, and State of Ohio, this 14th day of September, 1925.

ENOCH T. FERNGREN.